United States Patent [19]
Quigley

[11] Patent Number: 5,713,450
[45] Date of Patent: Feb. 3, 1998

[54] FRICTION DISC WITH SEGMENTED FRICTION FACING

[75] Inventor: James R. Quigley, Lombard, Minn.

[73] Assignee: Borg-Warner Automotive, Inc., Sterling Heights, Minn.

[21] Appl. No.: 724,729

[22] Filed: Sep. 30, 1996

[51] Int. Cl.⁶ .......................... F16D 13/72; F16D 13/74
[52] U.S. Cl. ................ 192/107 R; 188/218; 192/113.34
[58] Field of Search ........................... 192/107 R, 70.12, 192/70.13, 113.3, 113.34; 188/250 B, 218

[56] References Cited

U.S. PATENT DOCUMENTS

| | | | |
|---|---|---|---|
| 1,453,599 | 5/1923 | Parker | 192/113.3 |
| 3,397,760 | 8/1968 | Robins et al. | 192/107 R |
| 3,791,498 | 2/1974 | Wassermann | 192/113.34 |
| 3,904,000 | 9/1975 | Berger | 192/107 R X |
| 4,512,450 | 4/1985 | Babcock | 192/107 R X |

Primary Examiner—Andrea L. Pitts
Attorney, Agent, or Firm—Emch, Schaffer, Schaub et al.; Greg Dziegielewski

[57] ABSTRACT

A friction disc assembly (10) for use in clutch packs is disclosed. The friction disc assembly (10) includes a pair of annular friction facings (12–30) and an annular core plate (11) positioned between the friction facings (12–30). Each of the friction facings (12–30) includes a plurality of adjoining facing segments (14–31). Each segment (14–31) includes a notch (15–33) at one end and a tab (16–32) at the other end. Each notch (15–33) receives an adjoining tab (16–32) and defines a reservoir (21–35) adjacent the tab (16–32). The reservoir (21–35) receives unwanted stray fibers and cooling fluid. Another embodiment for wide core plates includes a pair of tabs (43–44) received in a pair of notches (45–46). Reservoirs (47–48) are defined adjacent the ends of the tabs (43–44).

7 Claims, 3 Drawing Sheets

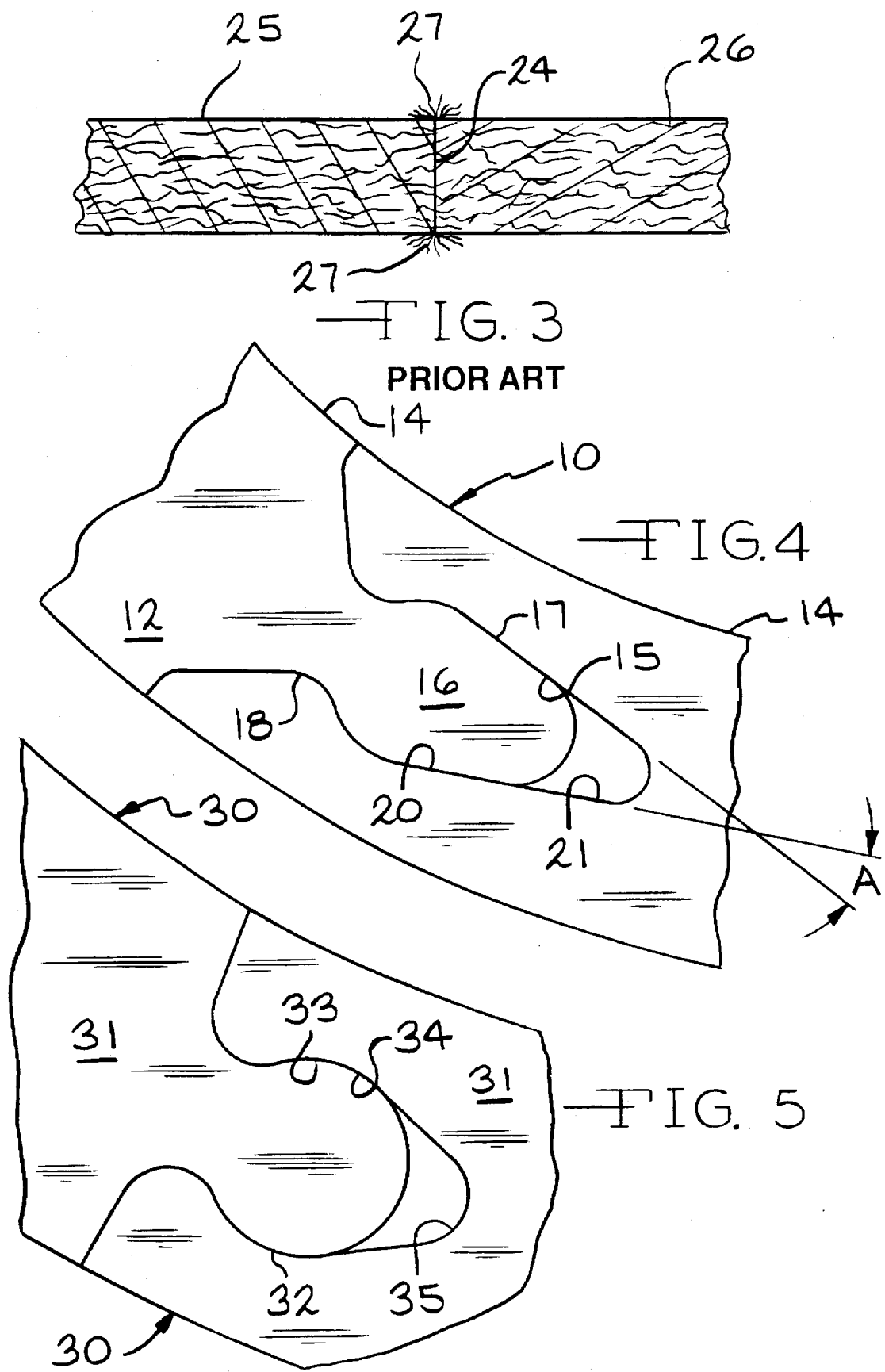

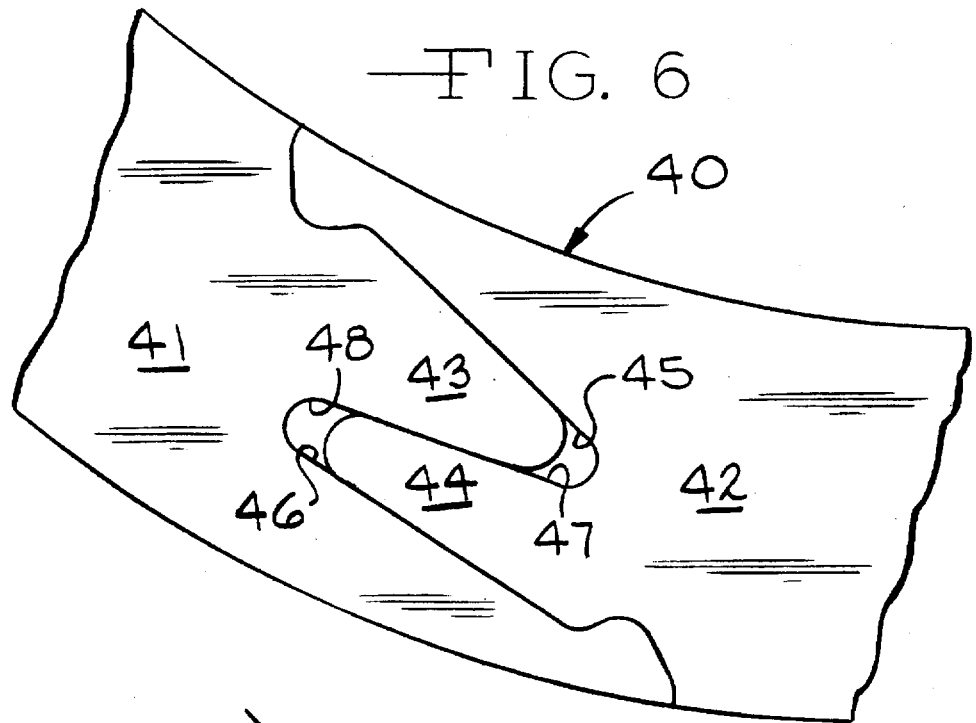
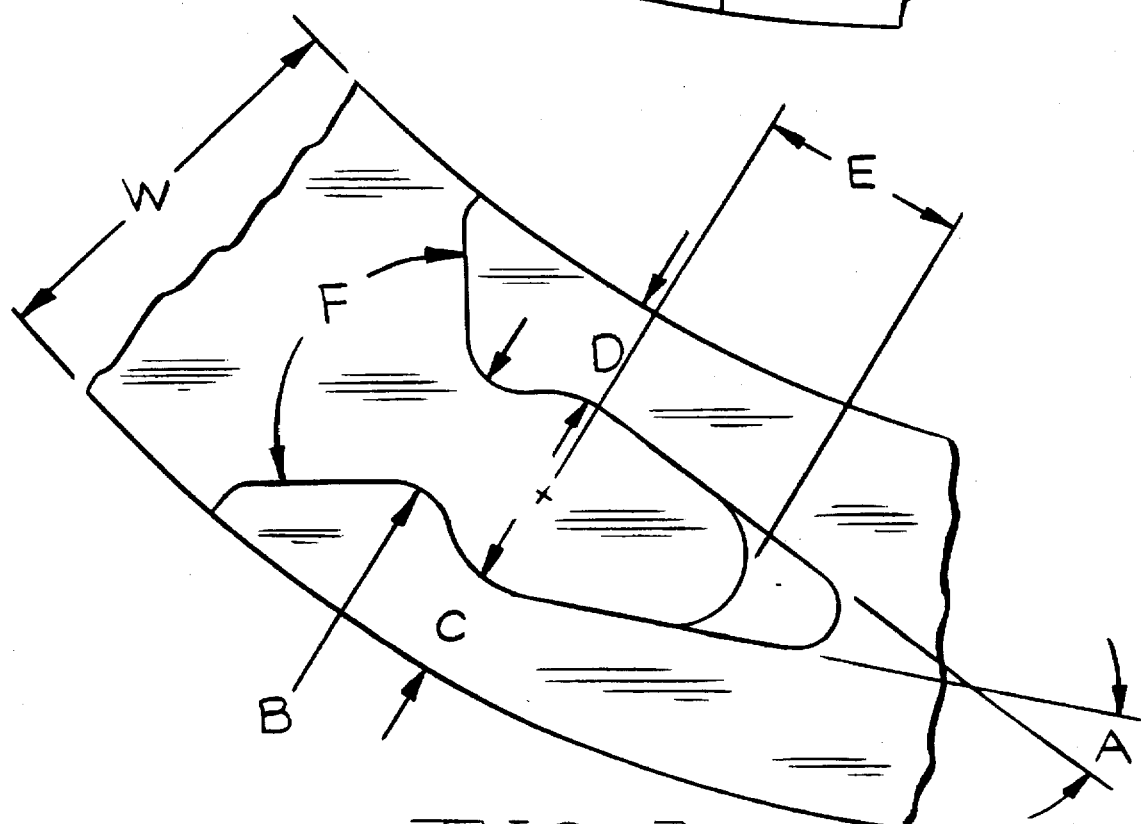

FRICTION DISC WITH SEGMENTED FRICTION FACING

BACKGROUND OF THE INVENTION

The present invention relates to friction plate facings and more particularly to an improved segmented friction facing. Friction plate facings, including segmented facings are well known in the art and are conventionally bonded to metal plates or core plates which are then incorporated into interleaved clutch packs.

The clutch plates are, for example, interconnected with inner hubs and outer drums of a clutch assembly and are normally engaged and disengaged by the use of hydraulic or spring actuated pistons.

One typical friction disc used in such clutch packs incorporates an annular steel ring or core plate and a pair of segmented friction facings which are bonded to the opposite sides of the core.

Segmented friction facings are disclosed in, for examples, U.S. Pat. Nos. 4,260,047; 4,449,621; 4,674,616; and 5,332,075.

The segments of a segmented facing normally comprises a tab at one end of a segment and a receiving notch or complementary opening defined by the adjacent segment. The failure of a tab segmented facing is thought to be the result of wear, fatigue and heat destruction resulting from the engagement of the friction producing facing against the metal separator plate. The heat and pressure often causes a breaking out of the surface of the material. This break out is initiated at the tab joint as the material is weakened by a cut and frayed edge. The type of fibers which are used to produce the segmented friction linings are, for example, tough aramid fibers which are difficult to cut and very durable under wear, heat and pressure. When cutting such fibrous material, it is desirable for the die cut edges to be in perfect alignment at the tabs and joints so that no frayed or hanging fiber material results from the die cutting process. Sometimes the die cutting process produces undesired loose fibers which extend from the cut edge. It has been found that such frayed cut edges when mated to its corresponding segment at a tab joint causes the segmented facing to prematurely fail at the tab joint. It is thought that the surface exposure of the extended loose fibers and the associated pressure, heat and geometry of the tab joint causes such premature failure at the joint area.

It is the primary object of the present invention to produce an improved friction disc assembly having a segmented friction facing.

SUMMARY OF THE INVENTION

The present invention is directed to an improved friction disc assembly including an improved segmental friction facing. Each of the segments includes a tab at one end and a notch at the other end. A reservoir is defined by each of the segments adjacent the tab. It has been found that the reservoir dissipates and distributes heat which is created at the midpoint of the tab and notch joint. The open area of the reservoir also has the ability to hold oil which is useful to keep the area cooler during engagement and after engagement. The open reservoir area tends to prevent fibers from being pushed to the surface.

In a preferred embodiment of the invention, the tab has an elongated shape, which is referred to herein as a gator shape.

DESCRIPTION OF THE DRAWINGS

FIG. 3 is a fragmentary cross-sectional view of a prior art segmental facing, illustrating a prior art segmental joint;

FIG. 4 is an enlarged, fragmentary plan view of a preferred segmental friction facing joint structure, according to the present invention;

FIG. 5 is a view similar to FIG. 4 showing another embodiment of a friction facing joint structure, according to the present invention;

FIG. 6 is a view similar to FIG. 4 showing still another embodiment of a friction facing joint structure, according to the present invention; and FIG. 7 is a diagrammatic plan view of the FIG. 4 embodiment.

DESCRIPTION OF THE PREFERRED EMBODIMENT

Figure 1:
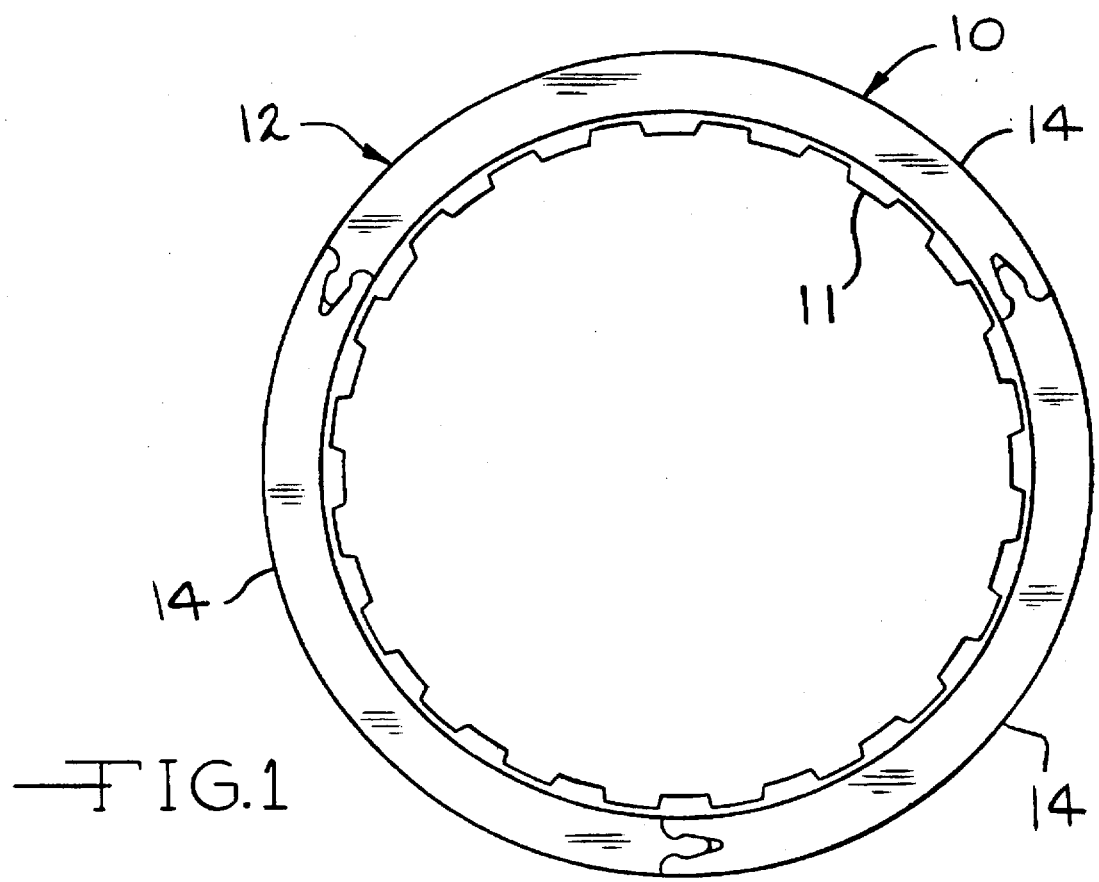
FIG. 1 is a plan view of a friction disc assembly, according to the present invention.
Figure 2:
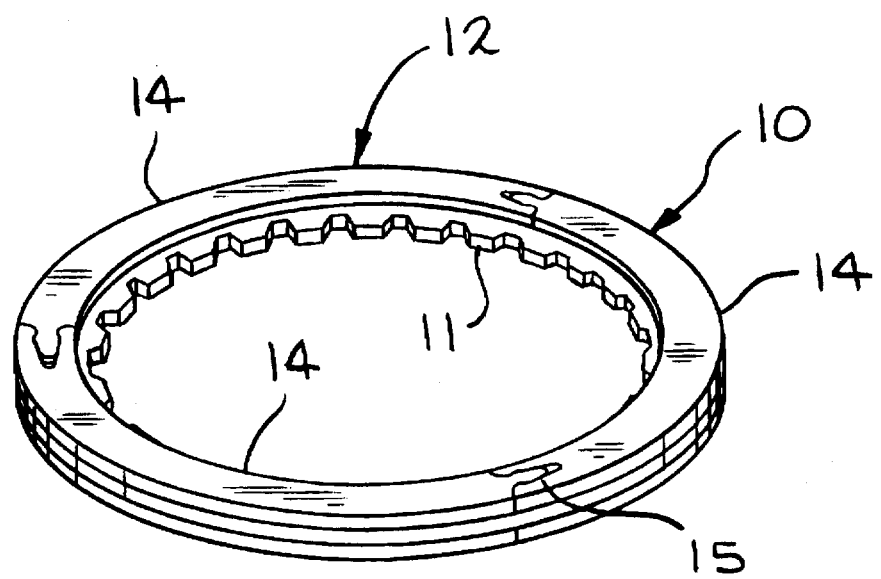
FIG. 2 is a perspective view of the friction disc assembly shown in FIG. 1.

Referring to FIGS. 1, 2 and 4, an improved segmental friction disc assembly, according to the present invention, is generally indicated by the reference number 10. The friction disc assembly 10 includes an annular metal core plate 11. An annular friction facing 12 is adhered to one or both sides of the annular core plate 11. In the present embodiment, each annular facing 12 is composed of three individual and adjoining facing segments 14, however, additional numbers of facing segments can be used in other embodiments.

Each adjoining facing segment 14 includes a first end defining a configured notch 15 and an opposite end defining a configured tab 16. Referring to FIG. 4, in the preferred embodiment, the tab 16 is elongated having a head portion 17 and a narrower neck portion 18. The head portion 17 and neck portion 18 define a gator shaped tab 16.

The notch or opening 15 has a first portion 20 which is complementary with and which receives the gator tab 16. The notch 15 has a second opening portion 21 which defines a reservoir adjacent the front end of the head portion 17 of the gator tab 16.

Referring to FIG. 4, if the side edges of the head portion 17 are extended to their intersection, they define an angle A. The angle A should preferably be less than 80°. In the preferred embodiment, shown in FIG. 4, the angle A is less than 60°. It has been found that by providing reduced tab angles along the centerline of direction of travel that failure of the tab-notch joints in the facing segments 14 are reduced.

FIG. 7 illustrates preferred dimension relationships of portions of the gator shaped tab 16. The throat width B is preferably equal to the sum of the side widths C and D. The distance E from the center of the gator tab 16 to the end of the gator tab 16 is preferably equal to two times the side width D.

As is true with the angle A, the angle F defined by the edges of the tab 16 is preferably less than 80°. In the FIG. 4 embodiment, the angle A is approximately 35°. The sum of the side widths C and D are preferably one-half the total width W.

FIG. 3 is a fragmentary view of the joint of a prior art facing segment, shown diagrammatically. A joint 24 is defined between a first facing segment 25 and a second facing segment 26. As discussed above, when tools become dull along the cutting edge as a result of repeated cycling, some of the tough fibers are not completely cut and are sometimes pulled from the cut area to form a group of frayed fibers 27. It is believed that these frayed fibers 27 cause the friction material to prematurely fail at the tab joint 24. The frayed fibers 27 are exposed to, for example, a mating separator plate surface and to the clutch pack's associated heat and pressure, which result from clutch engagement.

It has been found that the gator shape of the head portion 17 and the reservoir 21 reduce the possibility of failure. Heat is dissipated and distributed to the open reservoir area, which also tends to reduce the chance that fibers will be pushed to the surface. The reservoir area is also useful for holding fluid which provides heat dissipation cooling. The open reservoir area also allows frayed fibers to extend freely into the reservoir area during engagement as opposed to the prior art tab opening structures where no open reservoir area was provided.

Referring to FIG. 5, another embodiment of an annular friction facing is indicated by the reference number 30. The friction facing 30 includes a plurality of facing segments 31. Each facing segment 31 includes a tab 32 at one end, which is the typical prior art ball shaped tab. The other end of the facing segment 31 defines a notch 33 which includes a first portion 34 and a second portion 35. The first portion 34 of the notch 33 is complementary with and receives the adjoining ball shaped tab 32 of an adjacent facing segment 31. The second portion 35 of the notch 33 defines a reservoir for receiving fluids and also frayed fibers. While the prior art ball shaped tab 32 does not produce results which are as superior as the gator shaped tab 16, shown in the preferred embodiment in FIG. 4, the use of the reservoir 35 adjacent the ball shaped tab 32 produces a friction disc assembly and friction facing 30 which is superior to those known in the prior art.

Referring to FIG. 6, another embodiment of an annular friction facing is indicated by the reference number 40. The friction facing 40 includes a plurality of facing segments 41–42. This embodiment includes a pair of adjoining gator tabs 43–44. Notches 45–46 receive the tabs 43–44. The notches 45–46 define reservoirs 47–48 adjacent the ends of the gator tabs 43–44. The FIG. 6 embodiment is suitable for use with wider core plates.

Many revisions may be made to the above disclosed embodiments without departing from the scope of the present invention or from the following claims.

I claim:

1. A friction disc assembly (10) including a pair of annular friction facings (12–30), an annular core plate (11) positioned between said friction facings, each of said friction facings (12–30) including a plurality of adjoining facing segments (14–31), each segment including opposed ends having a tab (16–32) at one of said opposed ends and a notch (15–33) at the other opposed end, said tab (16–32) of one facing segment (14–31) being positioned within said notch (15–33) of an adjoining facing segment and a reservoir (21–35) defined by a portion of said notch adjacent said tab, whereby said reservoir (21–35) receives cooling fluid and stray fibers.

2. A friction disc assembly according to claim 1, wherein said tab (16) has an elongated shape, said tab (16) having side edges defining an angle (A) at their intersection of less than 80°.

3. A friction disc assembly, according to claim 1, wherein said tab (16) has a gator shape.

4. A friction disc assembly, according to claim 1, wherein said tab (32) has a ball shape.

5. A friction disc assembly, according to claim 3, wherein said notch (15) defines said reservoir (21) adjacent said gator shaped head (17).

6. A friction assembly, according to claim 1, including a pair of notches (45–46) which receive a pair of tabs (43–44) and a pair of reservoirs (47–48) defined by the notches (45–46) adjacent said tabs (43–44).

7. A friction assembly, according to claim 6, wherein said tabs (43–44) each have a gator shape.

* * * * *

UNITED STATES PATENT AND TRADEMARK OFFICE
CERTIFICATE OF CORRECTION

PATENT NO. : 5,713,450
DATED : February 3, 1998
INVENTOR(S) : James R. Quigley

It is certified that error appears in the above-identified patent and that said Letters Patent is hereby corrected as shown below:

On the cover page, under the Inventor: please delete, "James R. Quigley, Lombard, Minn." and insert --James R. Quigley, Lombard, Illinois--.

On the cover page, under the Assignee: please delete, "Borg-Warner Automotive, Inc., Sterling Heights, Minn." and insert --Borg-Warner Automotive, Inc., Sterling Heights, Michigan--.

Signed and Sealed this

Twenty-eighth Day of April, 1998

*Attest:*

BRUCE LEHMAN

*Attesting Officer*  *Commissioner of Patents and Trademarks*